(12) United States Patent
Peters

(10) Patent No.: US 9,692,810 B2
(45) Date of Patent: Jun. 27, 2017

(54) DYNAMIC USER INTERFACE LAYOUT ALGORITHM

(71) Applicant: Johan Christiaan Peters, St. Leon-Rot (DE)

(72) Inventor: Johan Christiaan Peters, St. Leon-Rot (DE)

(73) Assignee: SAP SE, Walldorf (DE)

( * ) Notice: Subject to any disclaimer, the term of this patent is extended or adjusted under 35 U.S.C. 154(b) by 324 days.

(21) Appl. No.: 14/249,089

(22) Filed: Apr. 9, 2014

(65) Prior Publication Data

US 2015/0295996 A1    Oct. 15, 2015

(51) Int. Cl.
| | |
|---|---|
| G06F 3/048 | (2013.01) |
| H04L 29/08 | (2006.01) |
| G06F 9/44 | (2006.01) |
| G06F 3/0481 | (2013.01) |
| H04L 29/06 | (2006.01) |

(52) U.S. Cl.
CPC ............ *H04L 67/10* (2013.01); *G06F 3/0481* (2013.01); *G06F 9/4443* (2013.01); *H04L 67/42* (2013.01)

(58) Field of Classification Search
CPC ..... G06T 3/4038; G06T 11/60; G06F 9/4443; G06F 3/04883; G06F 3/14
See application file for complete search history.

(56) References Cited

U.S. PATENT DOCUMENTS

| | | | |
|---|---|---|---|
| 6,300,947 B1 | 10/2001 | Kanevsky et al. | |
| 6,785,866 B1 * | 8/2004 | Lewis | G06F 9/4443 715/209 |
| 7,487,466 B2 | 2/2009 | Peters | |
| 7,503,009 B2 | 3/2009 | Peters | |
| 7,707,508 B1 * | 4/2010 | Moskalonek | G06T 11/60 715/762 |
| 7,707,512 B2 | 4/2010 | Peters | |
| 7,725,815 B2 | 5/2010 | Peters | |
| 7,729,956 B2 | 6/2010 | Peters | |

(Continued)

FOREIGN PATENT DOCUMENTS

WO     WO 01/09835 A1     2/2001

OTHER PUBLICATIONS

Communication and Extended European Search Report received from EPO Associate mailed Aug. 13, 2015 for EP Application No. 15000999.4-1954; 6 pages.

(Continued)

*Primary Examiner* — Rashawn Tillery
(74) *Attorney, Agent, or Firm* — Fish & Richardson P.C.

(57) ABSTRACT

The present disclosure describes methods, systems, and computer program products for generating user interface layouts. One computer-implemented method includes dividing an available vertical space associated with a graphical user interface into a plurality of allowed vertical space allocations based on a priority of a plurality of data display fields, calculating, by a computer, slack following each data display field expanding to fill an allowed vertical space allocation associated with the data display fields, allocating the slack among the plurality of data display fields, re-calculating, by a computer, slack following allocation of slack among the plurality of data display fields, and finalizing display of the plurality of data display elements in the graphical user interface.

20 Claims, 9 Drawing Sheets

(56) References Cited

U.S. PATENT DOCUMENTS

| | | |
|---|---|---|
| 7,730,427 B2 | 6/2010 | Peters |
| 7,814,165 B2 | 10/2010 | Peters |
| 7,877,685 B2 | 1/2011 | Peters |
| 8,099,419 B2 | 1/2012 | Peters |
| 8,230,335 B2 | 7/2012 | Peters |
| 8,612,471 B2 | 12/2013 | Peters |
| 2007/0143705 A1 | 6/2007 | Peters |
| 2007/0143706 A1 | 6/2007 | Peters |
| 2007/0143708 A1 | 6/2007 | Peters |
| 2007/0152959 A1 | 7/2007 | Peters |
| 2007/0156537 A1 | 7/2007 | Peters |
| 2007/0156820 A1 | 7/2007 | Peters |
| 2007/0157085 A1 | 7/2007 | Peters |
| 2007/0157097 A1 | 7/2007 | Peters |
| 2007/0157115 A1 | 7/2007 | Peters |
| 2007/0233902 A1 | 10/2007 | Trefler et al. |
| 2007/0297004 A1* | 12/2007 | Honda ............ G06F 17/248 358/1.15 |
| 2008/0149712 A1 | 6/2008 | Peters |
| 2011/0074824 A1* | 3/2011 | Srinivasan ......... G06F 3/04883 345/660 |
| 2011/0154194 A1 | 6/2011 | Mathai et al. |
| 2011/0185040 A1 | 7/2011 | Schmidt et al. |
| 2012/0054602 A1* | 3/2012 | Demant ............ G06F 9/4443 715/247 |
| 2012/0159297 A1 | 6/2012 | Peters |
| 2013/0073606 A1 | 3/2013 | Law-How-Hung et al. |
| 2013/0106913 A1* | 5/2013 | Edmiston ............ G06F 3/14 345/660 |
| 2013/0147845 A1 | 6/2013 | Xie et al. |
| 2013/0173486 A1 | 7/2013 | Peters et al. |
| 2013/0174093 A1 | 7/2013 | Peters et al. |
| 2013/0191767 A1 | 7/2013 | Peters et al. |
| 2013/0191778 A1 | 7/2013 | Peters et al. |
| 2014/0048599 A1 | 2/2014 | Peters |
| 2014/0189502 A1* | 7/2014 | Enns ............... G06T 3/4038 715/247 |

OTHER PUBLICATIONS

Linton M.A. et al "Composing User Interfaces with Interviews" Computer, US, IEEE Computer Society, Long Beach., CA, US. vol. 22, No. 2, Feb. 1, 1989, pp. 8-22, XP000186141.

Haarslev V et al.: "Visualization and graphical layout in object-oriented systems" Journal of Visual Languages and Computing, Mar. 1992, UK, vol. 3, No. 1, pp. 1-23, XP000912232.

Hostetter M et al: "Curl a Gentle Slope Language for the Web" World Wide Web Journal, US, Sebastopol, CA, US, 1997, pp. 121-134, XP000910842.

Myers B A et al. "Garnet Comprehensive Support for Graphical, Highly Interactive User Interfaces" Computer, US, IEEE Computer Society, Long Beach., CA, US, vol. 23, No. 11, Nov. 1, 1990, pp. 71-85., XP000173297.

* cited by examiner

200b

| Name | Johann Christiaan Peters | 202b |
| ID | 445 | |
| Description | | 204b |
| RUID | MyAgency_Z_ID_1__445 | |
| RID | 445 | 206b |
| Name | Please describe daily work goals | |
| Description | | |
| Label | NULL | |

FIG. 2B

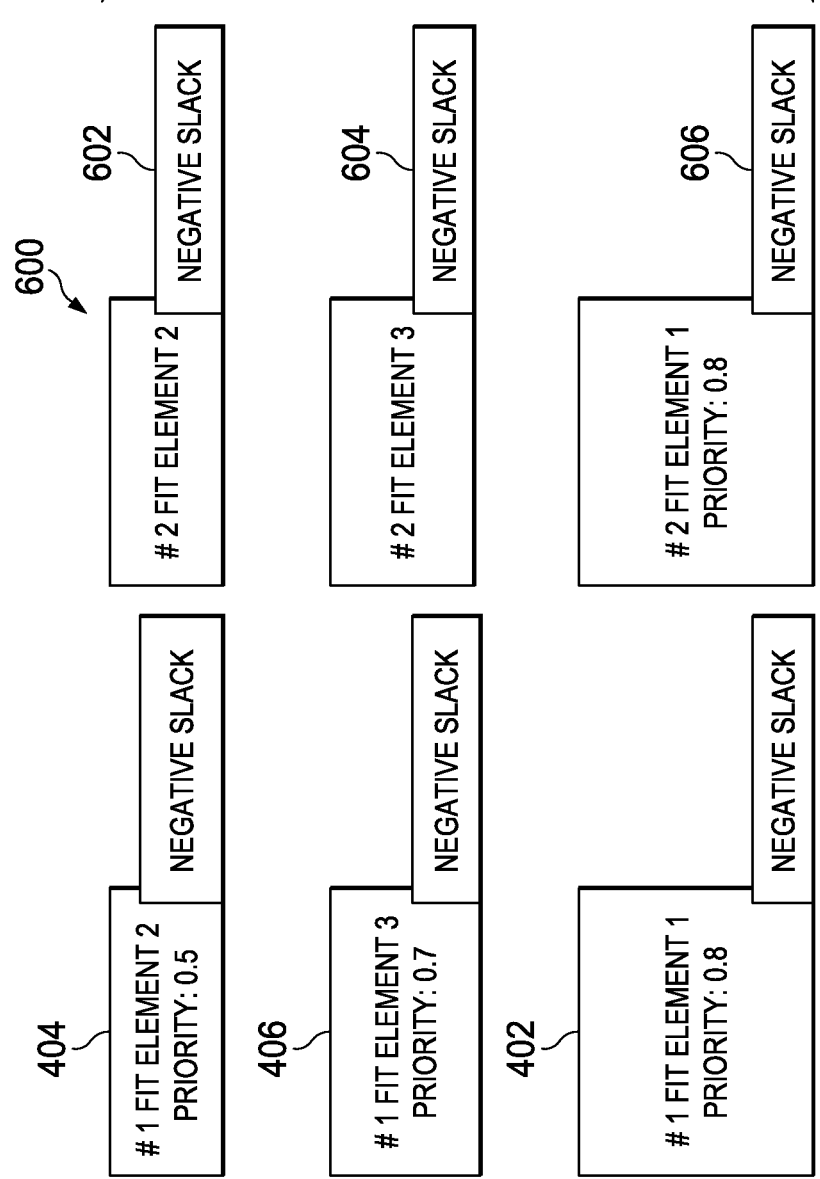

| | | |
|---|---|---|
| Name | Johann Christiaan Peters | — 202b |
| ID | 445 | |
| Description | | — 204b |
| RUID | MyAgency_Z_ID_1__445 | — 206b |
| RID | 445 | |
| Name | Please describe daily work goals | |
| Description | | |
| Label | NULL | |

FIG. 8

DYNAMIC USER INTERFACE LAYOUT ALGORITHM

CROSS-REFERENCE TO RELATED APPLICATIONS

This application is related to co-pending U.S. patent application Ser. No. 14/249,066, filed on Apr. 9, 2014, and Entitled "Generation of User Interfaces by Considering Field Importance and Using Smart Controls and Layouts", the entire contents of which are hereby incorporated by reference.

BACKGROUND

Modern computing devices, for example a laptop computer, smartphone, and tablet computer, have the capability to provide a rich and diverse set of data to an application user. These computing devices, however, have visual displays of varying sizes, some with limited display space with which to display information. Applications that are executable on multiple of these computing devices must generate user interfaces (UIs) that fit within the varying visual displays to display information to the application user. Some factors an application must take into consideration when faced with limited display space are layout considerations, the importance of information to display, and efficiently displaying the information so as to not waste visual display space. The lack of ability by an application to effectively display information using varying display sizes can result in user dissatisfaction, loss of revenue, a poor user experience, and/or rejection of the application and use of a competing product.

SUMMARY

The present disclosure relates to computer-implemented methods, computer-readable media, and computer systems for generating user interface layouts. One computer-implemented method includes dividing an available vertical space associated with a graphical user interface (GUI) into a plurality of allowed vertical space allocations based on a priority of a plurality of data display fields, calculating, by a computer, slack following each data display field expanding to fill an allowed vertical space allocation associated with the data display fields, allocating the slack among the plurality of data display fields, re-calculating, by a computer, slack following allocation of slack among the plurality of data display fields, and finalizing display of the plurality of data display elements in the GUI.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the calculated slack is either positive or negative.

A second aspect, combinable with any of the previous aspects, further comprising requesting, for calculated positive slack, that each data display field resizes from highest priority to lowest priority to expand into a vertical space including its current size, remaining allowed vertical space allocation, and determined slack.

A third aspect, combinable with any of the previous aspects, further comprising requesting, for calculated negative slack, that each data display field resizes from lowest priority to highest priority to shrink into a vertical space including its current size minus the determined slack.

A fourth aspect, combinable with any of the previous aspects, further comprising determining whether the plurality of data display elements need to be resized based on the re-calculated slack.

A fifth aspect, combinable with any of the previous aspects, further comprising setting a horizontal or a vertical tab value to align data display fields on the GUI.

A sixth aspect, combinable with any of the previous aspects, further comprising hiding a data display element if negative slack remains following re-calculating slack.

The subject matter described in this specification can be implemented in particular implementations so as to realize one or more of the following advantages. First, an application's usefulness is enhanced by the ability to generate visually appealing/useful applications on varying computing device display sizes. Second, important information is ensured of priority in considerations of display space. Third, display fields are calculated to be large enough so as to display all necessary information without being so large as to waste display space. Fourth, information is also given a longer display time the more important it is determined to be in relation to other information. Fifth, in some implementations, a GUI field length is calculated before the data is available, which gives the impression of a direct response as compared to a dynamic GUI that is rendered only when data is available at a front-end UI. Sixth, a GUI can be adapted for a user's context (e.g., a user that predominantly enters a United States ZIP code would have a different length for a ZIP code UI field than a user that enters mostly Dutch postal codes). Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 2B is an example screenshot of the rendered GUI of FIG. 2A with data displayed according to an implementation.

FIG. 6 is a block diagram illustrating dividing negative slack between data display fields to be absorbed according to an implementation.

FIG. 8 is an example screenshot of the GUI of FIG. 2B after a dynamic vertical layout calculation is performed according to an implementation.

Like reference numbers and designations in the various drawings indicate like elements.

DETAILED DESCRIPTION

This disclosure generally describes computer-implemented methods, computer-program products, and systems for generating user interface layouts. The following description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Modern computing devices, for example a laptop computer, smartphone, and tablet computer, have the capability to provide a rich and diverse set of data to an application user. These computing devices, however, have visual displays of varying sizes, some with limited display space with which to display information. Applications that are executable on multiple of these computing devices must generate graphical user interfaces (GUIs) that fit within the varying visual displays to display information to the application user. Some factors an application must take into consideration when faced with limited display space are layout considerations, the importance of information to display, and efficiently displaying the information so as to not waste visual display space. The lack of ability by an application to effectively display information using varying display sizes can result in user dissatisfaction, loss of revenue, a poor user experience, and/or rejection of the application and use of a competing product.

Figure 1:
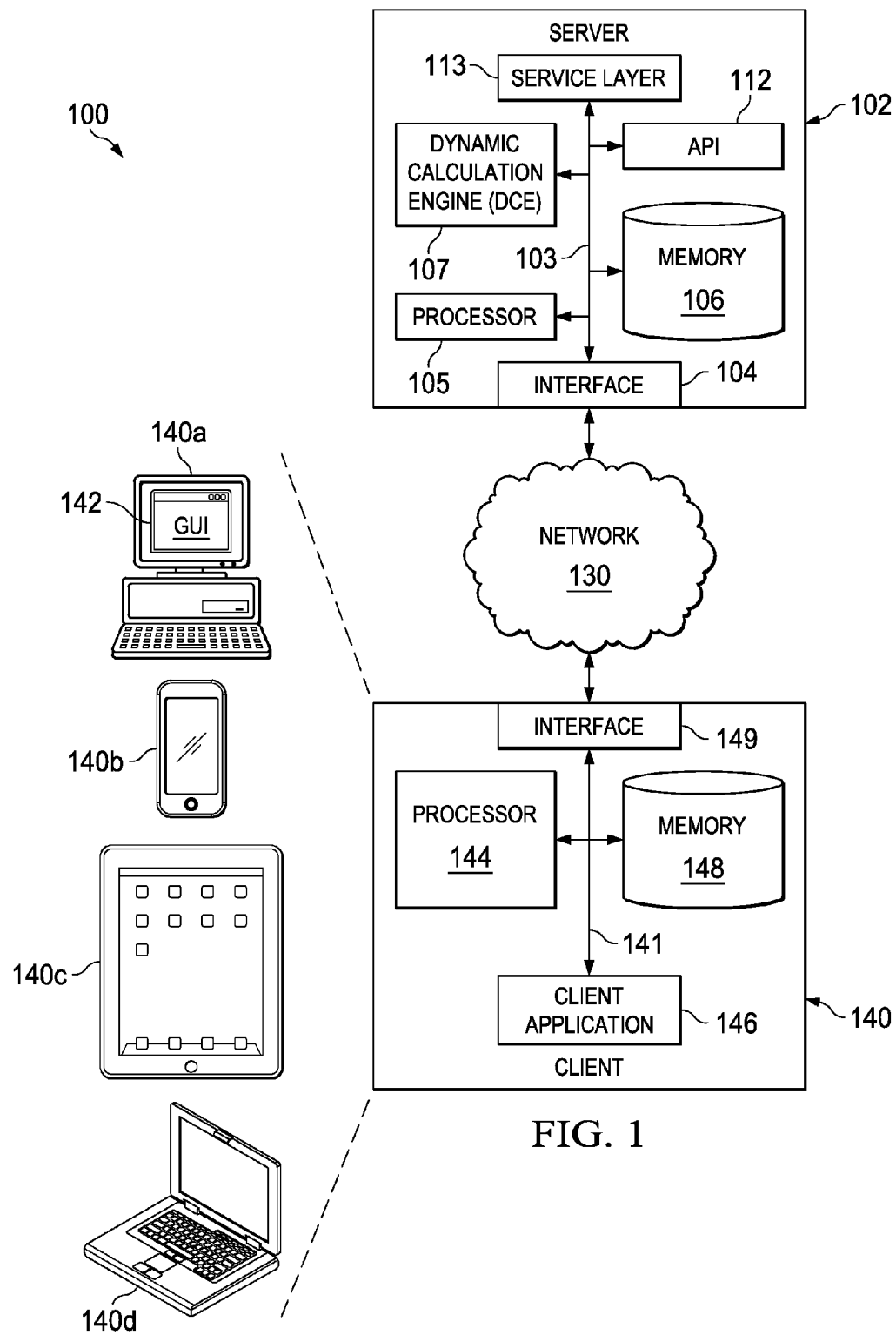
FIG. 1 is a block diagram illustrating an example distributed computing system for generating user interface layouts according to an implementation.

FIG. 1 is a block diagram illustrating an example distributed computing system (EDCS) 100 for generating user interface layouts according to an implementation. The illustrated EDCS 100 includes or is communicably coupled with a server 102 and a client 140 (an example of a computing device as mentioned above) that communicate across a network 130. In some implementations, one or more components of the EDCS 100 may be configured to operate within a cloud-computing-based environment.

At a high level, the server 102 is an electronic computing device operable to receive, transmit, process, store, or manage data and information associated with the EDCS 100. According to some implementations, the server 102 may also include or be communicably coupled with an e-mail server, a web server, a caching server, a streaming data server, a business intelligence (BI) server, and/or other server.

In general, the server 102 is a server that provides functionality for generating GUIs. While the following description describes functionality to dynamically generate user interface layouts generally from the perspective of the server 102, in some implementations, some or all of the functionality for generating user interface layouts can be partially or wholly handled by the client 140 and/or other component of the EDCS 100.

The server 102 is responsible for receiving, among other things, requests and content from one or more client applications 146 associated with the client 140 of the EDCS 100 and responding to the received requests. In some implementations, the server 102 processes the requests at least in the dynamic calculation engine (DCE) 107. In addition to requests received from the client 140, requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the DCE 107.

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required for generating GUI layouts and/or associated administrative functionality related to the generation functionality.

The server 102 also includes a memory 106 that holds data for the server 102, client 140, and/or other components of the EDCS 100. Although illustrated as a single memory 106 in FIG. 1, two or more memories may be used according to particular needs, desires, or particular implementations of the EDCS 100. While memory 106 is illustrated as an integral component of the server 102, in alternative implementations, memory 106 can be external to the server 102 and/or the EDCS 100. In some implementations, memory 106 can be configured to store one or more instances of user profiles, objects and content, client 140 data, and/or other appropriate data.

The DCE 107 provides functionality to, among other things, generate user interface layouts. The generation function can include determining appropriate content length of various data fields to be displayed on a GUI, determine appropriate horizontal/vertical layouts of various display elements (e.g., text fields, images, selectable elements, etc.) associated with a GUI, determine positive and/or negative slack associated with the horizontal/vertical layout calculations, and/or re-adjust display element sizes accordingly. These example functionalities are discussed further below. In some implementations, layouts generated by the DCE 107 are displayed in a web-based (e.g., HTML-type format) and can be served and displayed in a client application 146 associated with the client 140. In some implementations, the DCE 107 can provide and/or modify content provided and/or made available by other components of the EDCS 100. In other words, the DCE 107 can act in conjunction with one or more other components of the server 102 and/or EDCS 100 in responding to a request for content received from the client 140.

Although illustrated as a single DCE 107, the DCE 107 may be implemented as multiple DCEs 107. In addition, although illustrated as integral to the server 102, in alternative implementations, the DCE 107 can be external to the server 102 and/or the EDCS 100 (e.g., wholly or partially executing on the client 140, other server 102 (not illustrated), etc.).

Once a particular DCE 107 is launched, the particular DCE 107 can be used, for example by an application or other component of the EDCS 100 to interactively process a GUI layout (e.g., web page, portal page, mobile computing device, etc.) and information/content associated with the GUI. In some implementations, the DCE 107 may be a network-based, web-based, and/or other suitable application consistent with this disclosure.

In some implementations, a particular DCE 107 may operate in response to and in connection with at least one request received from other DCEs 107, other components (e.g., software and/or hardware modules) associated with another server 102, and/or other components of the EDCS 100. In some implementations, the DCE 107 can be accessed and executed in a cloud-based computing environment using the network 130. In some implementations, a portion of a particular DCE 107 may be a web service associated with the DCE 107 that is remotely called, while another portion of the DCE 107 may be an interface object or agent bundled for processing by any suitable component of the EDCS 100. Moreover, any or all of a particular DCE 107 may be a child or sub-module of another software module or application (not illustrated) without departing from the scope of this disclosure. Still further, portions of the particular DCE 107 may be executed or accessed by a user working directly at the server 102, as well as remotely at a corresponding client 140. In some implementations, the server 102 or any suitable component of server 102 or the EDCS 100 can execute the DCE 107.

The client 140 may be any computing device operable to connect to and/or communicate with at least the server 102. In general, the client 140 comprises an electronic computing device operable to receive, transmit, process, and store any appropriate data associated with the EDCS 100, for example, the DCE 107. More particularly, among other things, the client 140 can collect content from the client 140 and upload the collected content to the server 102 for integration/processing into/by the DCE 107. The client typically includes a processor 144, a client application 146, a memory 148, and/or an interface 149 interfacing over a system bus 141.

The client application 146 is any type of application that allows the client 140 to navigate to/from, request, view, create, edit, delete, administer, and/or manipulate content associated with the server 102 and/or the client 140. For example, the client application 146 can present GUI displays and associated data to a user generated by the DCE 107, accept user input, and transmit the user input back to the server 102 for dissemination to the appropriate components of server 102, in particular the DCE 107. In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a request for a particular application GUI to the server 102.

In some implementations, the client application 146 can also be used perform administrative functions related to the DCE 107. For example, the DCE 107 can generate and/or transmit administrative pages to the client application 146 based on a particular user login, request, etc.

Further, although illustrated as a single client application 146, the client application 146 may be implemented as multiple client applications in the client 140. For example, there may be a native client application and a web-based (e.g., HTML) client application depending upon the particular needs of the client 140.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140, including the functionality required to send requests to the server 102 and to receive and process responses from the server 102.

The memory 148 typically stores objects and/or data associated with the purposes of the client 140 but may also be consistent with the above-described memory 106 of the server 102 or other memories within the EDCS 100 and be used to store data similar to that stored in the other memories of the EDCS 100 for purposes such as backup, caching, and the like.

Further, the illustrated client 140 includes a GUI 142 that interfaces with at least a portion of the EDCS 100 for any suitable purpose. For example, the GUI 142 (illustrated as associated with client 140a) may be used to view data associated with the client 140, the server 102, or any other component of the EDCS 100. In particular, in some implementations, the client application 146 may render GUI interfaces received from the DCE 107.

There may be any number of clients 140 associated with, or external to, the EDCS 100. For example, while the illustrated EDCS 100 includes one client 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140a-140d) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142 (illustrated by way of example only with respect to the client 140a).

Content Length Calculation

The usual approach to displaying/rendering a data display field on a GUI is to use the length description of a particular data display field in a database. The drawback is that the length descriptions and associated data display fields have usually been designed to fit the longest reasonable/possible occurrence of a particular type of information. Therefore, in most case data display fields are rendered much larger than typically necessary.

Another approach is to render fields based on the particular information that is to be presented. This obviously gives a good fit on a GUI, but also has drawbacks including: 1) the same screens might be rendered differently depending on the information presented, leading to usability issues due to changing GUI renderings and 2) Screens can only be rendered after the data is available at the front-end (e.g., client 140/client application 146) which increases the time to prepare a GUI for a user. It is preferable to immediately render a GUI and then pass in the data to be displayed as it becomes available. In this way, the perceived responsiveness by the user of the GUI is much higher.

The DCE 107 is capable of calculating/determining and/or rendering information so that data display fields (when appropriate) are large enough to display all necessary information without being so large that there is a lot of extra wasted space (e.g., white space) in the data display field. The DCE is also capable of immediately rendering a GUI and then passing in the data to be displayed as it becomes available.

In some implementations, statistical distributions are compiled for field lengths within a database. In some implementations, the distributions can be calculated on a per-user basis. For example: 1) city names in the UK may be longer than city names in Germany. Therefore a UK user who deals with city names in the UK could have shorter city name fields on his screens than a German user and 2) ZIP codes in Germany have five characters while in Holland ZIP codes have seven characters. In the case of ZIP codes, each user would automatically have fields rendered to the length for their country depending on the ZIP codes used (e.g., if all ZIP codes to be displayed were of the same country, largely of the same country, etc. Note that since the ZIP code (or other data display field determination can be per-user, all users could have the same field displayed on a GUI but each user's field could be of a different length.

In some implementations, information necessary to perform per-user calculations is stored in metadata related to the user, the data fields of the GUI to be displayed, etc. For example, metadata about a user can be retrieved when an application is loaded by the user and therefore made available over the lifetime of the application usage. The retrieved metadata can reveal, for example, that they are a German or a Dutch citizen and reside in their respective countries (to determine ZIP code length, etc.).

In some implementations, content length calculation can be performed using a structured query language (SQL) or equivalent SELECT statement similar to:

SELECT AVG(CHAR_LENGTH(<column>)) AS avg-Length FROM <table>

This example SQL statement performs an average of data display field content lengths for a user. In other implementations, continuous distribution functions and/or other functions can be used to determine content length calculations.

Within an application the used calculation method can be used to determine the content length necessary for each data display field associated with a GUI. In some implementations, recursive algorithms can be used to determine possible content lengths for compound controls (a control containing/grouped with multiple data display fields). In some implementations, an upper and/or lower threshold can be used to further constrain the calculation. For example, if a GUI content length calculation should not return less then fifteen characters, a lower threshold of fifteen can be implemented to ensure that the content length calculation does not return a value below the threshold. In some implementations, scheduled analysis runs can be performed (e.g., at off-peak hours) to lessen an impact on a database's (e.g., memory 106) or other EDCS 100 component's performance.

Figure 2A:
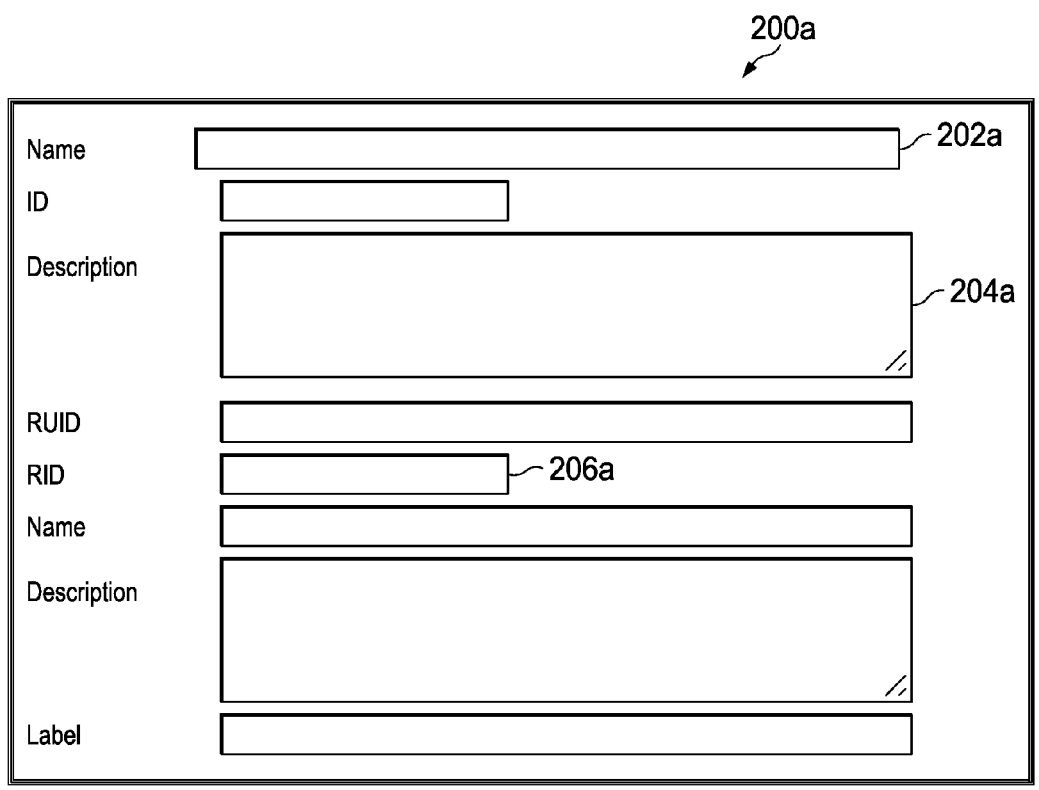
FIG. 2A is an example screenshot of a graphical user interface (GUI) rendered following a content length calculation based on metadata according to an implementation.

Turning now to FIGS. 2A & 2B, FIG. 2A is an example screenshot of a GUI 200a rendered following a content length calculation based on metadata according to an implementation. In FIG. 2A, note that no data is displayed in each rendered data display field, for example "Name" 202*a*, "Description" 204*a*, and "RID" 206*a*. FIG. 2B is an example screenshot of the rendered GUI 200*a* of FIG. 2A with data displayed according to an implementation. Note that various fields contain data, for example "Name" 202*b*, "Description" 204*b*, and "RID" 206*b*. In some implementations, the content length calculation can also take into account a known GUI size restriction (e.g., the GUI will be displayed on a particular smartphone or tablet computer model).

The example screenshots and GUIs illustrated in FIGS. 2A & 2B are presented as examples only and are not meant to cover all possible GUI implementations but to enhance understating of the described concepts. Various modifications to the disclosed implementations will be readily apparent to those skilled in the art, and the general principles defined herein may be applied to other implementations and applications without departing from scope of the disclosure.

Dynamic Vertical Layout Calculation

In some implementations, a dynamic vertical layout calculation can be performed following a content length calculation. In other implementations, a dynamic vertical layout calculation can be performed independent of a content length calculation. Note that the content length calculation described above typically affects horizontal lengths of data display fields (e.g., text fields) and can be used to help constrain horizontal displays of data into a smaller horizontal space.

A dynamic vertical layout calculation algorithmically determines how much vertical space each data display field associated with a GUI has available to display itself (a vertical space allocation) taking into account available vertical space/how much vertical space the data display field requires and/or how long each data display field is visible taking into account it's relative importance in relation to other data display fields. Note that the following description focuses particularly on determining vertical layout spacing for data display fields on a GUI. While the above-described content length calculation can be used to partially or wholly determine horizontal spacing of data display fields on a GUI, as will be appreciated by those of ordinary skill in the art, horizontal space calculations can, in some implementations, be calculated using methods similar to those described for dynamic vertical layout calculations, but modified for use on the horizontal axis. In some implementations, calculations similar to those for dynamic vertical layout calculations can be performed prior to and/or after a vertical layout calculation to account for horizontal spacing of data display fields on a GUI. This disclosure envisions the use of the dynamic vertical layout calculation method on the horizontal as well as Z axis (e.g., height in a 3D GUI) or other axes as appropriate.

Figure 3:
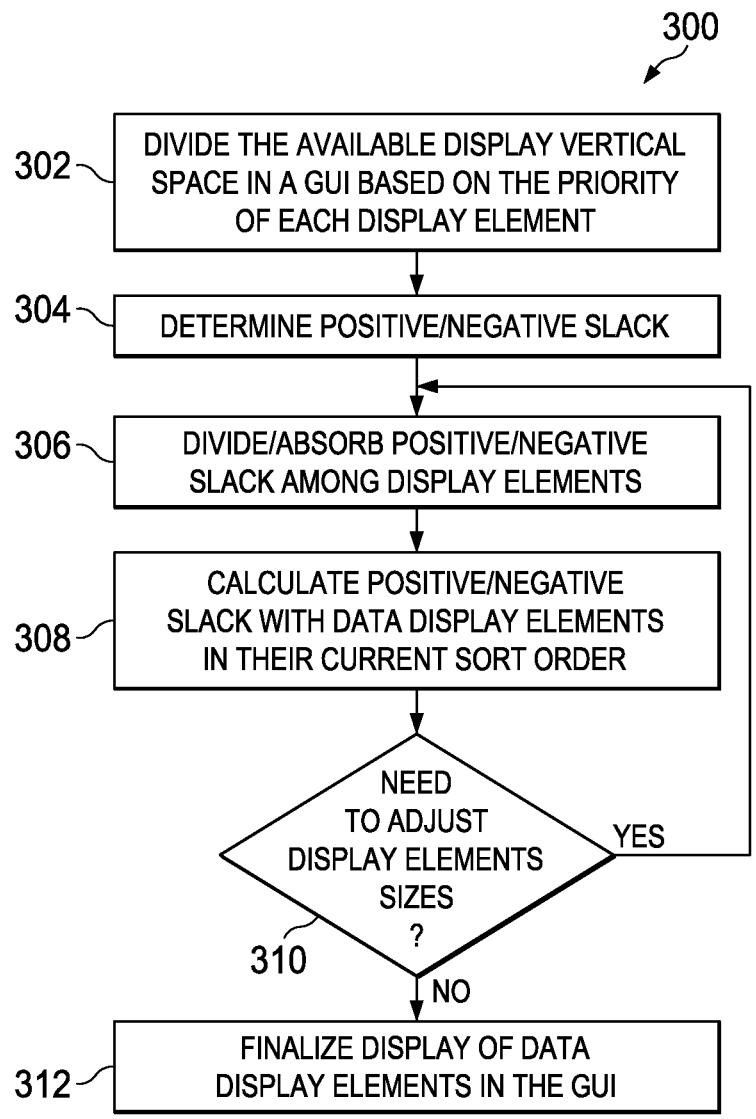
FIG. 3 is a flow chart illustrating a method for generating user interface layouts according to an implementation.

FIG. 3 is a flow chart illustrating a method 300 for generating user interface layouts according to an implementation. For clarity of presentation, the description that follows generally describes method 300 in the context of FIGS. 1, 2A & 2B, 4A & 4B, 5-6, 7A & 7B, and 8. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, or in any order.

At 302, the vertical space available for a GUI is divided based on available GUI vertical space and the priority of each data display field. In other words, each data display field receives an amount of vertical space in which to display itself proportional to its importance in relation to other data display fields. For example, a data display field with a priority of 0.8 would receive more space than a data display field with a priority of 0.7 or 0.5. Any priority indication scheme can be used (e.g., using letters, numbers, alphanumeric characters, codes, etc.) as long as a priority hierarchy between different data display fields can be determined. Each data display field, e.g., three data display fields with priority 0.8, 0.7, and 0.5, is asked to resize itself to a space determined based on its importance.

Figure 4A:
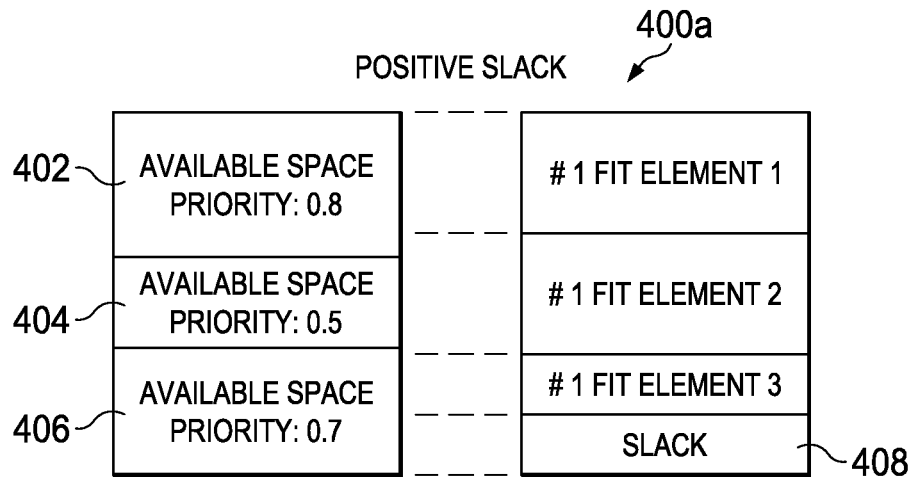
FIG. 4A is a block diagram illustrating positive slack according to an implementation.
Figure 4B:
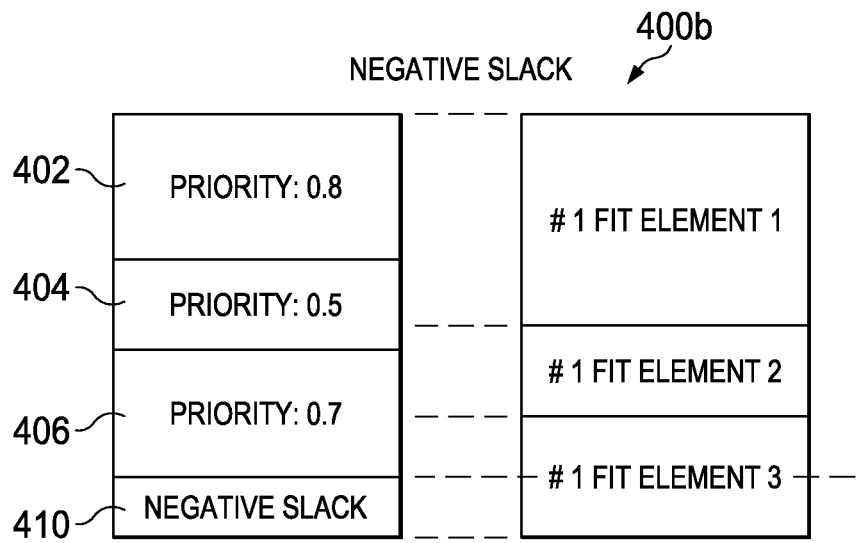
FIG. 4B is a block diagram illustrating negative slack according to an implementation.

FIGS. 4A & 4B are block diagrams illustrating positive and negative slack as a result of the first fit division of space due to 302 with three data display fields 402, 404, and 406. FIG. 4A is a block diagram illustrating positive slack 408 according to an implementation. As can be seen in FIG. 4A, data display fields 402, 404, and 406 have resized themselves in a first fit size according to sizes determined based on available vertical space and their relative importance to each other into a combined space smaller than that available vertically. Following their resizing, slack 408 remains. Slack 408 is considered positive in that it is within the available vertical space of the GUI interface and is still usable to attempt to further allow one or more data display fields to become larger. FIG. 4B is a block diagram illustrating negative slack 410 according to an implementation. As can be seen in FIG. 4B, data display fields 402, 404, and 406 have resized themselves in a first fit size according to sizes determined based on available vertical space and their relative importance to each other into a combined space larger than that available vertically. This may happen because one or more elements may want space that combines to exceed available vertical space; data display fields may actually need more space than originally allocated, etc. Following their resizing, slack 410 exists. Slack 410 is considered negative in that it is not within the available vertical space of the GUI interface and must be absorbed by one or more data display fields (i.e., they must become smaller) in order for the combined data display fields to fit within the available vertical display space. Returning to FIG. 3, from 302, method 300 proceeds to 304.

At 304, the positive/negative slack amount is determined as a result of the division performed in 302. From 304, method 300 proceeds to 306.

Figure 5:
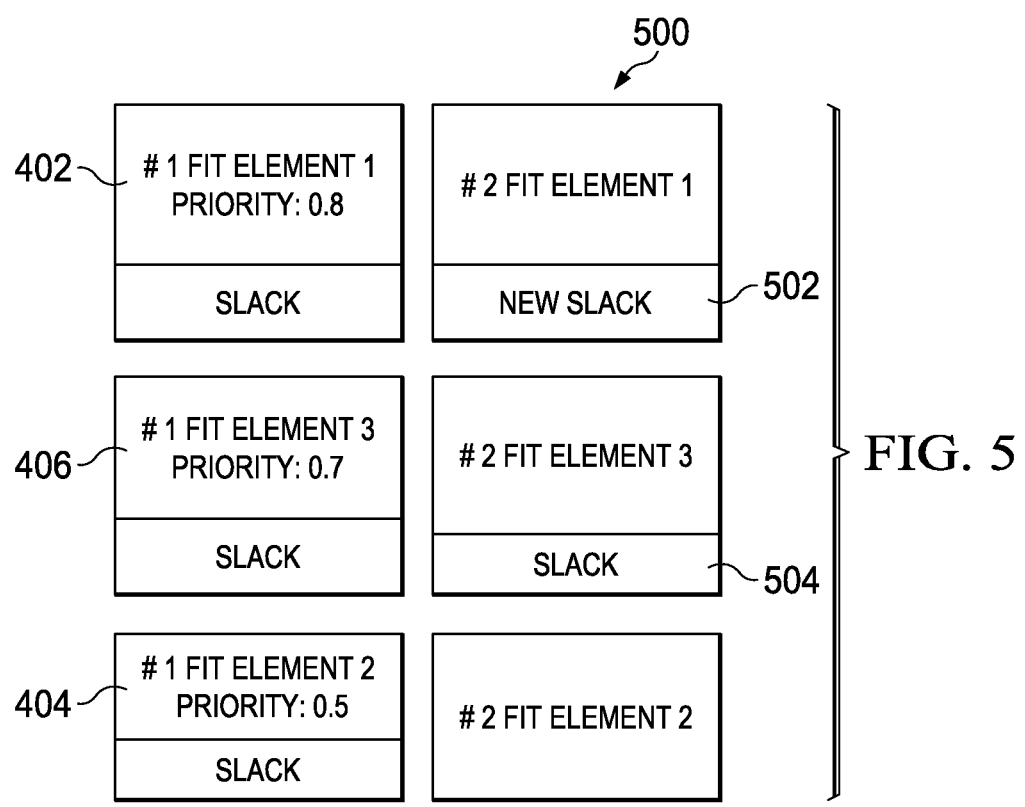
FIG. 5 is a block diagram illustrating dividing positive slack between data display fields according to an implementation.
Figure 7A:
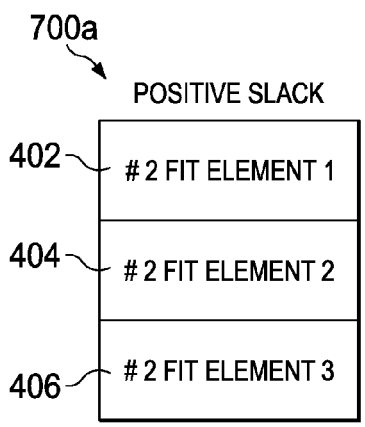
FIG. 7A illustrates the vertical space allocation of data display fields following the example positive slack division with respect to FIG. 5 according to an implementation.

At 306, the determined amount of slack (positive or negative) is divided or absorbed, respectively, with respect to the data display fields. FIG. 5 is a block diagram 500 illustrating dividing positive slack between data display fields according to an implementation. With positive slack, there is probably enough slack for all data display fields to be displayed. An attempt is made to divide the positive slack among the data display fields from highest priority to least priority (i.e., descending priority) as a second fit (allow them in sequence to expand if logical/possible). Element 1 (data display field 402) is given its current size plus all slack (remaining size it could have expanded into as indicated by priority 0.8 in FIG. 4A) and asked to resize into that vertical space. Note that a first fit in to the total 0.8 vertical space may not have been enough for an extra line of text, image, etc. but combined with the positive slack 408, data display field 402 might be able to expand. Assume, however, that even with the additional offered vertical space, data display field 402 keeps it current size. As a result, the total positive slack 502 actually increases (slack from FIG. 4A that 402 did not originally expand into plus the positive slack). Moving to element 3 (data display field 406), data display field 406 is given its current size and all remaining slack (as was display field 402) and asked to expand into that vertical space. Assume 406 takes all the space it wants and expands leaving a small amount of remaining positive slack 504. Moving to element 2 (data display field 404), data display field 404 would like to expand and takes the remaining space so slack 504 goes to zero size. FIG. 7A illustrates the vertical space allocation of data display fields following the example positive slack division with respect to FIG. 5 according to an implementation.

FIG. 6 is a block diagram 600 illustrating dividing negative slack between data display fields to be absorbed according to an implementation. With negative slack, there may not be enough vertical space for all data display fields to be displayed. An attempt is made to divide the negative slack (i.e., request that the data display fields shrink to absorb the negative slack) among the data display fields from lowest priority to highest priority as a second fit. The reverse order of priority ensures that the lowest priority elements are required to shrink first. For example, in a UI implementation with displayed elements Name, Street, House Number, ZIP, and City, the display order will remain as listed, but when dividing the negative slack between them the order of application of negative slack can be different (e.g., Street is a lower priority than City). In this case, Street will be shrunk before City even though it is before City in the display order due to Street's lower priority.

Figure 7B:
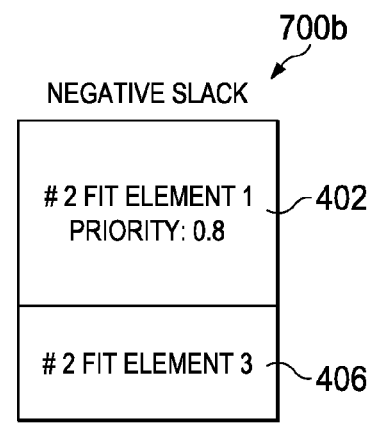
FIG. 7B illustrates the vertical space allocation of data display fields following the example negative slack absorption with respect to FIG. 6 according to an implementation.

As lower priority elements are required to shrink first if possible, element 2 (data display field 404) is given its current size plus all slack and asked to resize into that vertical space (shrink). Assume that element 2 is able to shrink and reduces the negative slack 602. Moving to element 3 (data display field 406), data display field 406 is given its current size and negative slack 602 and asked to shrink into that vertical space. Assume data display field 406 shrinks slightly. Negative slack 604 remains, though not as much as before due to the shrinkage of data display field 406 offsetting the negative slack 602. Moving to element 1 (data display field 402), data display field 402 shrinks a bit, but not enough to completely offset the negative slack 604. As a result, some negative slack 606 still exists and an element will have to be hidden to compensate for the remaining negative slack 606. Following the example above, when space is still insufficient, Street would be hidden first before City, because it is the last field in the priority order (even though it is the second field in the display order). FIG. 7B illustrates the vertical space allocation of data display fields following the example negative slack absorption with respect to FIG. 6 according to an implementation. Returning to FIG. 3, from 306, method 300 proceeds to 308.

Figure 7C:
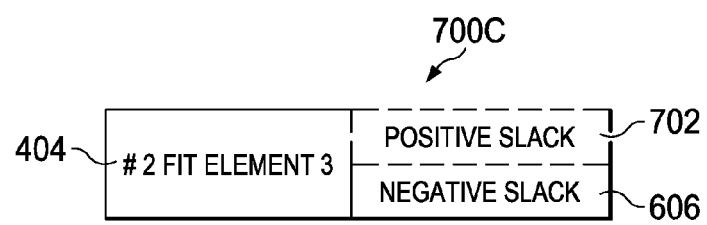
FIG. 7C illustrates negative slack being transformed into positive slack due to a data display field being hidden according to an implementation.

At 308, a calculation of remaining positive/negative slack is performed with elements in their current sort order. Here, since negative slack remains, the lowest priority element is hidden (data display element 404—element 2). Note that the slack is then recalculated by adding the size of the hidden element to the total slack. This ensures that no more space is taken than is actually available. FIG. 7C illustrates negative slack 606 being transformed into positive slack 702 due to a data display field (404) being hidden according to an implementation. Data display elements 402 and 406 would be displayed without data display element 404 as data display element 404 is hidden. In some implementations, data display element priorities can be calculated periodically (e.g., once a month), so changes to the UI will also happen periodically based on the priority changes. From 308, method 300 proceeds to 310.

At 310, an optional determination is performed as to whether the data display field sizes need to be re-calculated based on the calculated positive/negative slack at 308. If it is determined that the data display field sizes need to be re-calculated, method 300 proceeds to 306. For example, a further calculation is performed to allow both elements 402 and 406 to absorb the positive slack (e.g., in descending priority order). If it is determined that the data display field sizes do not need to be re-calculated, method 300 proceeds to 312.

At 312, the data display fields are finalized in the GUI. For example, for the negative slack example above associated with FIG. 6, the entire element 2 (data display field 404) can be hidden due to the remaining negative slack (606) associated with this data display field leaving data display fields 402 and 406 displayed. In some implementations, it may be possible to hide a portion of data display field 404 as opposed to the entire data display field. From 312, method 300 stops.

FIG. 8 is an example screenshot 800 of the GUI 200b of FIG. 2B after a dynamic vertical layout calculation is performed according to an implementation. Following the content length calculation based on metadata described with respect to FIGS. 2A & 2B, the above-described dynamic vertical layout calculation is performed on the GUI of FIG. 2B. Note that the resultant modified GUI of FIG. 2B (GUI 800) has been fit within a horizontal constraint (e.g., maximum horizontal GUI threshold, physical GUI horizontal value, etc.). Also, note that as a result of the dynamic vertical layout calculation, at least "Description" 204b has been resized to be "deeper" (adding additional lines) due to a higher priority than other data display fields (e.g., 202b and 206b). In some implementations, factors such as loss of horizontal space can also be factored into the dynamic vertical layout calculation to increase data display field priority, etc.

Note that in some implementations, a data display field can have multiple associated data display fields. For example, a GUI could be broken into multiple combination display areas where the above-described calculations (both content length calculation and dynamic vertical layout calculation) can be performed on each of the data display fields in each combination display area and then on the combination display areas as a group.

In some implementation, visual alignment of data display fields can also be taken into consideration in the dynamic vertical layout calculation. For example, in a situation where multiple columns of data display fields are present, the slack/vertical size of each data display field can be taken into account to better align the vertical boundaries of adjacent data display fields between columns to prevent a haphazard/random looking arrangement of data display fields in a GUI. In some implementations, tabs, spacing, images, etc. can be used to help with the alignment. For example, a data display field in a positive slack situation could be provided with an amount of vertical space in which to fit as well as a tab space to modify its size to specific boundaries (e.g., horizontal and/or vertical tabs could be set). In some implementations, percentages could be used for vertical and/or horizontal tabs to be independent of the actual size of a data display element).

In some implementations, the following software code can be used to perform the above-described functionality:

```
UI5VerticalLayout.prototype.setSize = function(size) {
    var content = this.UI5.getContent( );
    var totalPrio = this.getPrio( ).weighted;
    var ns;
    var height = 0;
    var slack = 0;
    var y;
    var yPad = 7;
    // calculate the available space for each element, proportional to its importance.
    // than have each element resize to the largest size that fist into this space
    // and calculate slack
    content.forEach(function(o,i) {
        y = Math.max(0, slack) + size[1] * o.data("template").getPrio( ).weighted / totalPrio;
        ns = o.data("template").setSize([size[0], y]);
        o.size = ns; // store size on UI5 object since not available
        slack = y − ns[1];
        height += ns[1];
    });
    // sort by priority from high to low
    content.sort(function(a,b) {
        return b.data("template").getPrio( ).weighted − a.data("template").getPrio( ).weighted;
    });
    // add remaining slack to all objects
    slack = size[1] − height;
    height = 0;
    (slack >= 0 ? content : content.reverse( )).forEach(function(o,i) { // if slack > start with
heighest prio elements, if slack < 0 start with lowest prio elements
        y = o.size[1] + slack; // give element its own space + available slack
        ns = o.data("template").setSize([size[0], y]); // compute new height of element
        o.size = ns; // store as new attribute size on UI5 object since not available in UI5
        slack += (o.size[1] − ns[1]); // calculate remaining slack = slack − difference
between old and new size of element
        height += ns[1]; // add height of element to total height
    });
    slack = size[1] − height;
    content.forEach(function(o,i) {
        var hidecontent = lgGetAttr(o.data("template").struc,"format.hidecontent", true);
        if ((slack < 0 || o.size[1] <= 0) && hidecontent) {
            slack += o.size[1];
            height −= o.size[1];
            o.setVisible(false);
        }else {
            o.setVisible(true);
        }
    });
    this.UI5.setWidth(size[0] + "px");
    return [size[0], height];
};
```

The preceding example software code is presented as an examples only and not not meant to cover all possible software code implementations but to enhance understating of the described concepts. Various modifications to the disclosed implementations will be readily apparent to those skilled in the art, and the general principles defined herein may be applied to other implementations and applications without departing from scope of the disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
dividing an available vertical space associated with a graphical user interface (GUI) into a plurality of allowed vertical space allocations, wherein each allowed vertical space allocation specifies how much vertical space each data display field of a plurality of data display fields has to display itself in the GUI, wherein the allowed vertical space allocation is based on a priority assigned to each data display field of the plurality of data display fields, and wherein each allowed vertical space allocation is proportional to the priority assigned to the data display field in relation to the priority assigned to other data display fields;
calculating, by a computer, slack following each data display field expanding to fill an allowed vertical space allocation associated with the plurality of data display fields;
allocating the slack among the plurality of data display fields;
re-calculating, by a computer, slack following allocation of slack among the plurality of data display fields; and
finalizing display of the plurality of data display elements in the GUI.

2. The method of claim 1, wherein the calculated slack is either positive or negative.

3. The method of claim 1, further comprising requesting, for calculated positive slack, that each data display field resizes from highest priority to lowest priority to expand into a vertical space including its current size, remaining allowed vertical space allocation, and determined slack.

4. The method of claim 1, further comprising requesting, for calculated negative slack, that each data display field resizes from lowest priority to highest priority to shrink into a vertical space including its current size minus the determined slack.

5. The method of claim 1, further comprising determining whether the plurality of data display elements need to be resized based on the re-calculated slack.

6. The method of claim 1, further comprising setting a horizontal or a vertical tab value to align data display fields on the GUI.

7. The method of claim 1, further comprising hiding a data display element if negative slack remains following re-calculating slack.

8. A non-transitory, computer-readable medium storing computer-readable instructions executable by a computer and operable to:
divide an available vertical space associated with a graphical user interface (GUI) into a plurality of allowed vertical space allocations, wherein each allowed vertical space allocation specifies how much vertical space each data display field of a plurality of data display fields has to display itself in the GUI, wherein the allowed vertical space allocation is based on a priority assigned to each data display field of the plurality of data display fields, and wherein each allowed vertical space allocation is proportional to the priority assigned to the data display field in relation to the priority assigned to other data display fields;
calculate slack following each data display field expanding to fill an allowed vertical space allocation associated with the plurality of data display fields;

allocate the slack among the plurality of data display fields;

re-calculate slack following allocation of slack among the plurality of data display fields; and finalize display of the plurality of data display elements in the GUI.

9. The method of claim 8, wherein the calculated slack is either positive or negative.

10. The medium of claim 8, further comprising instructions to request, for calculated positive slack, that each data display field resizes from highest priority to lowest priority to expand into a vertical space including its current size, remaining allowed vertical space allocation, and determined slack.

11. The medium of claim 8, further comprising instructions to request, for calculated negative slack, that each data display field resizes from lowest priority to highest priority to shrink into a vertical space including its current size minus the determined slack.

12. The medium of claim 8, further comprising instructions to determine whether the plurality of data display elements need to be resized based on the re-calculated slack.

13. The medium of claim 8, further comprising instructions to set a horizontal or a vertical tab value to align data display fields on the GUI.

14. The medium of claim 8, further comprising instructions to hide a data display element if negative slack remains following re-calculating slack.

15. A system, comprising:
a memory;
at least one hardware processor interoperably coupled with the memory and configured to:
divide an available vertical space associated with a graphical user interface (GUI) into a plurality of allowed vertical space allocations, wherein each allowed vertical space allocation specifies how much vertical space each data display field of a plurality of data display fields has to display itself in the GUI, wherein the allowed vertical space allocation is based on a priority assigned to each data display field of the plurality of data display fields, and wherein each allowed vertical space allocation is proportional to the priority assigned to the data display field in relation to the priority assigned to other data display fields;

calculate slack following each data display field expanding to fill an allowed vertical space allocation associated with the plurality of data display fields;

allocate the slack among the plurality of data display fields;

re-calculate slack following allocation of slack among the plurality of data display fields; and finalize display of the plurality of data display elements in the GUI.

16. The system of claim 15, wherein the calculated slack is either positive or negative.

17. The system of claim 15, further configured to request, for calculated positive slack, that each data display field resizes from highest priority to lowest priority to expand into a vertical space including its current size, remaining allowed vertical space allocation, and determined slack.

18. The system of claim 15, further configured to request, for calculated negative slack, that each data display field resizes from lowest priority to highest priority to shrink into a vertical space including its current size minus the determined slack.

19. The system of claim 15, further configured to determine whether the plurality of data display elements need to be resized based on the re-calculated slack.

20. The system of claim 15, further configured to hide a data display element if negative slack remains following re-calculating slack.

\* \* \* \* \*